United States Patent
Toyoshima et al.

(10) Patent No.: US 9,486,821 B2
(45) Date of Patent: Nov. 8, 2016

(54) COATING APPARATUS FOR APPLYING COATING MATERIAL ONTO SHEET MEMBER

(71) Applicant: NISSAN MOTOR CO., LTD., Yokohama-shi, Kanagawa (JP)

(72) Inventors: Kenichi Toyoshima, Yokohama (JP); Kei Ono, Yokohama (JP); Masaya Yamamoto, Yokosuka (JP); Norifumi Horibe, Fujisawa (JP); Takayuki Terasaki, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/431,434

(22) PCT Filed: Aug. 27, 2013

(86) PCT No.: PCT/JP2013/072819
§ 371 (c)(1),
(2) Date: Mar. 26, 2015

(87) PCT Pub. No.: WO2014/050406
PCT Pub. Date: Apr. 3, 2014

(65) Prior Publication Data
US 2015/0217308 A1   Aug. 6, 2015

(30) Foreign Application Priority Data
Sep. 28, 2012   (JP) ................. 2012-217075

(51) Int. Cl.
*B05B 5/14*   (2006.01)
*B05C 13/02*   (2006.01)
(Continued)

(52) U.S. Cl.
CPC ............. *B05B 5/14* (2013.01); *B05B 13/02* (2013.01); *B05C 5/0283* (2013.01); *H01M 4/881* (2013.01);
(Continued)

(58) Field of Classification Search
None
See application file for complete search history.

(56) References Cited

U.S. PATENT DOCUMENTS 5,003,325 A * 3/1991 Bibl ........................ G01D 15/28
346/136
6,171,658 B1 * 1/2001 Zaretsky ................. G03C 1/74
427/420

(Continued)

FOREIGN PATENT DOCUMENTS

EP   1 857 189 A1   11/2007
EP   2 618 414 A1   7/2013

(Continued)

*Primary Examiner* — Binu Thomas
(74) *Attorney, Agent, or Firm* — Foley & Lardner LLP

(57) ABSTRACT

[Object] To provide a coating apparatus that can prevent distortion of the shape of a coating area on a sheet member. [Solution Means] A coating apparatus 50 includes a suction roller peripheral wall 114a (base plate 70) on which a flexible electrolyte membrane 21 shaped like a thin film (sheet member 60) is placed, drawing unit 80 that draws the electrolyte membrane on the suction roller peripheral wall, and a coating mechanism 90 that applies catalyst ink 91 (material) onto the electrolyte membrane drawn on the suction roller peripheral wall by the drawing unit.

The electrolyte membrane has, in a range from a center portion to a portion on an inner side of an outer peripheral edge 61, a coating area 62 where the catalyst ink is applied. The drawing unit draws the electrolyte membrane on the suction roller peripheral wall in the coating area where the catalyst ink is applied, and also draws the electrolyte membrane on the suction roller peripheral wall 114a in a range 63 extending outward beyond the coating area.

6 Claims, 4 Drawing Sheets

(51) Int. Cl.
  *B05C 5/00*    (2006.01)
  *H01M 8/00*    (2016.01)
  *B05B 13/02*   (2006.01)
  *H01M 4/88*    (2006.01)
  *B65H 5/00*    (2006.01)
  *B65G 47/92*   (2006.01)
  *B05C 5/02*    (2006.01)
  *H01M 8/10*    (2016.01)
  *B05C 13/00*   (2006.01)

(52) U.S. Cl.
  CPC ............... *B05C 5/02* (2013.01); *B05C 5/0245* (2013.01); *B05C 5/0254* (2013.01); *B05C 13/00* (2013.01); *B65G 47/92* (2013.01); *B65H 5/004* (2013.01); *H01M 2008/1095* (2013.01); *Y02E 60/50* (2013.01)

(56) References Cited

U.S. PATENT DOCUMENTS

| | | | |
|---|---|---|---|
| 2003/0198860 A1* | 10/2003 | Yasumoto | H01M 4/8605 427/115 |
| 2013/0196254 A1* | 8/2013 | Uehara et al. | H01M 4/8828 429/535 |

FOREIGN PATENT DOCUMENTS

| | | |
|---|---|---|
| JP | 2002-270189 A | 9/2002 |
| JP | 2005-205268 A | 8/2005 |
| JP | 2006-164790 A | 6/2006 |
| JP | 2007-250539 A | 9/2007 |
| JP | 2008-027738 A | 2/2008 |
| JP | 2009-129777 A | 6/2009 |
| JP | 2010-257634 A | 11/2010 |
| WO | WO 2012/036007 A1 | 3/2012 |

* cited by examiner

COATING APPARATUS FOR APPLYING COATING MATERIAL ONTO SHEET MEMBER

TECHNICAL FIELD

The present invention relates to a coating apparatus that applies a material onto a sheet member.

BACKGROUND ART

In response to recent social demands and trends in the context of energy and environment problems, fuel cells capable of operating even at ordinary temperature and obtaining high output density have attracted attention as a power supply for an electric car and a stationary power supply. A fuel cell is a clean power generation system in which an electrode reaction product is water in principle and which reduces the load on the global environment. In particular, a polymer electrolyte fuel cell (PEFC) is expected as a power supply for an electric car because it operates at relatively low temperature.

A polymer fuel cell includes a membrane electrode assembly (MEA, hereinafter referred to as MEA) having an electrolyte membrane, catalyst layers provided on both surfaces of the membrane, gas diffusion layers (GDLs), and so on. A plurality of MEAs are stacked with separators being disposed therebetween to constitute a fuel cell.

As a technique of forming electrode catalyst layers on both surfaces of an electrolyte membrane when manufacturing an MEA, a method of applying catalyst ink onto the electrolyte membrane is known (see, for example, Patent Literature 1). In the method described in Patent Literature 1, an outer peripheral frame is attached to an electrolyte membrane such as to clamp an outer peripheral portion of the electrolyte membrane. A porous sheet is disposed in an aperture of the outer peripheral frame sheet, and catalyst ink is applied while vacuum-sucking the electrolyte membrane via the porous sheet. The porous sheet protects a coating area where the catalyst ink is applied.

CITATION LISTS

Patent Literature

[Patent Literature 1]
Japanese Unexamined Patent Application Publication No. 2009-129777

SUMMARY OF INVENTION

Technical Problem

In the method described in Patent Literature 1, when the electrolyte membrane is vacuum-sucked via the porous sheet, it is drawn in a range on an inner side of an outer peripheral edge portion of the porous sheet, that is, in a range on an inner side of the outer periphery of the coating area.

For this reason, if a wrinkle occurs in the outer peripheral portion of the electrolyte membrane within the coating area or a wrinkle occurs in a range extending outward beyond the coating area, the distance between a mechanism for applying the catalyst ink and the electrolyte membrane is changed by the influence of the wrinkle. As a result, the shape of an electrode reacting portion of the electrolyte membrane is distorted, and dimensional changes in size and thickness of the applied catalyst occur. Deformation of the electrolyte membrane deteriorates cell performance of a fuel cell to which this electrolyte membrane is applied.

The present invention has been made in view of the above circumstance, and an object of the invention is to provide a coating apparatus that can prevent distortion of the shape of a coating area on a sheet member.

Solution to Problem

A coating apparatus according to the present invention for achieving the above objet includes a base plate on which a flexible sheet member shaped like a thin film is placed, a drawing unit that draws the sheet member onto the base plate, and a coating mechanism that applies a material onto the sheet member drawn on the base plate by the drawing unit. The sheet member has, in a range from a center portion to a portion on an inner side of an outer peripheral edge, a coating area where the material is to be applied. The drawing unit includes a mechanism configured to electrostatically draw the sheet member, draws the sheet member on the base plate in the coating area Where the material is to be applied, and also draws the sheet member on the base plate in a range extending outward beyond the coating area. The range extending outward beyond the coating area is larger than the coating area and smaller than the sheet member.

DESCRIPTION OF EMBODIMENTS

Figure 1:
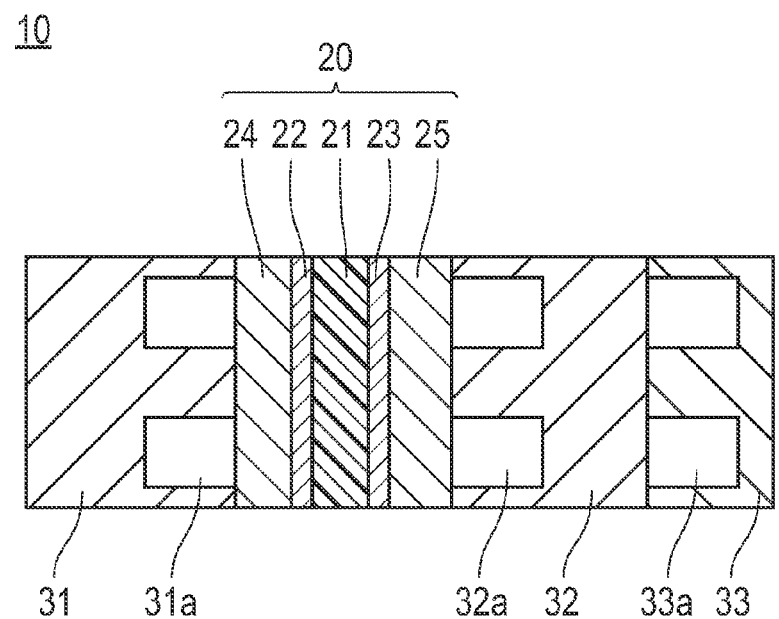
FIG. 1 is a cross-sectional view illustrating a cell structure of a fuel cell.

Embodiments of the present invention will be described below with reference to the attached drawings. In the description of the drawings, the same elements are denoted by the same reference numerals, and redundant descriptions thereof are skipped. The dimensional ratios in the drawings are exaggerated for convenience of explanation, and are different from actual ratios.

(First Embodiment)

FIG. 1 is a cross-sectional view illustrating a cell structure of a fuel cell.

Referring to FIG. 1, a single cell 10 is applied to, for example, a polymer electrolyte fuel cell (PEFC) using hydrogen as fuel, and includes an MEA 20 and separators 31 and 32. When the single cell 10 is to be stacked, for example, it further includes a cooling plate 33. Refrigerant channels through which a refrigerant for cooling the single cell 10 flows are formed by grooves 33a provided in the cooling plate 33.

The MEA 20 includes a polymer electrolyte membrane 21, catalyst layers 22 and 23, and gas diffusion layers (GDLs) 24 and 25.

The catalyst layer 22 contains a catalytic component, a conductive catalyst carrier for carrying the catalytic component, and a polymer electrolyte, serves as an anode catalyst layer in which an oxidation reaction of hydrogen proceeds, and is disposed on one side of the electrolyte membrane 21. The catalyst layer 23 contains a catalytic component, a conductive catalyst carrier for carrying the catalytic component, and a polymer electrolyte, serves as a cathode catalyst layer in which a reduction reaction of oxygen proceeds, and is disposed on the other side of the electrolyte membrane 21.

The electrolyte membrane 21 has the function of selectively allowing protons generated by the catalyst layer 22 to pass therethrough into the catalyst layer 23 and the function as a barrier that prevents mixture of fuel gas supplied to the anode side and oxidant gas supplied to the cathode side.

The gas diffusion layer 24 is an anode gas diffusion layer that diffuses the fuel gas supplied to the anode side, and is located between the separator 31 and the catalyst layer 22. The gas diffusion layer 25 is a cathode gas diffusion layer that diffuses the oxidant gas supplied to the cathode side, and is located between the separator 32 and the catalyst layer 23.

The separators 31 and 32 have the function of electrically connecting the single cell 10 in series and the function as barriers for isolating the fuel gas, the oxidant gas, and the refrigerant. Each of the separators 31 and 32 has almost the same shape as that of the MEL 20, and is formed, for example, by press-working a stainless steel sheet. The stainless steel sheet is preferable because of its ease of complicated machining and high conductivity, and can be subjected to corrosive-resistant coating as necessary.

The separator 31 is an anode separator disposed on the anode side of the MEL 20, is opposed to the catalyst layer 22, and has grooves 31a located between the MEA 20 and the separator 31 to form gas passages. The grooves (gas passages) 31a are used to supply fuel gas to the catalyst layer 22.

The separator 32 is a cathode separator disposed on the cathode side of the MEA 20, is opposed to the catalyst layer 23, and has grooves 32a located between the MEA 20 and the separator 32 to form gas passages. The grooves (gas passages) 32a are used to supply oxidant gas to the catalyst layer 23.

Next, the materials, sizes, and so on of the constituent members will be described in detail.

To the electrolyte membrane 21, a fluorine-based electrolyte membrane formed of a perfluorocarbon sulfonic acid polymer, a hydrocarbon-based resin membrane containing a sulfonate group, or a porous membrane impregnated with an electrolytic component, such as phosphoric acid or ionic liquid, can be applied. Examples of perfluorocarbon sulfonic acid polymers are Nafion (registered trademark, manufactured by Du Pont Corporation), Aciplex (registered trademark, manufactured by Asahi Kasei Corporation), and Flemion (registered trademark, manufactured by Asahi Glass Co., Ltd.). The porous membrane is formed of, for example, polytetrafluoroethylene (PTFE) or polyvinylidene difluoride (PVDF).

While the thickness of the electrolyte membrane 21 is not particularly limited, it is preferably 5 to 300 μm, and more preferably 10 to 200 μm from the viewpoints of strength, durability, and output characteristics.

The catalytic component used in the catalyst layer (cathode catalyst layer) 23 is not particularly limited as long as it catalyzes a reduction reaction of oxygen. The catalytic component used in the catalyst layer (anode catalyst layer) 22 is not particularly limited as long as it catalyzes an oxidation reaction of hydrogen.

A specific catalytic component is selected from, for example, metals such as platinum, ruthenium, iridium, rhodium, palladium, osmium, tungsten, lead, iron, chromium, cobalt, nickel, manganese, vanadium, molybdenum, gallium, and aluminum, and an alloy of these metals. To enhance catalytic activity, poisoning resistance to carbon monoxide or the like, heat resistance, etc., the catalytic component preferably contains at least platinum. The catalytic component to be applied does not always need to be the same between the cathode catalyst layer and the anode catalyst layer, and can be changed appropriately.

While the conductive carrier of the catalyst used in the catalyst layers 22 and 23 is not particularly limited as long as it has a specific surface area such as to carrier the catalytic component in a desired diffused state and a sufficient electronic conductivity as a current collector, a main component thereof is preferably carbon particles. For example, the carbon particles are formed of carbon black, activated carbon, coke, natural graphite, or artificial graphite.

The polymer electrolyte used in the catalyst layers 22 and 23 is not particularly limited as long as it has at least high proton conductivity. For example, a fluorine-based electrolyte containing fluorine atoms in the entirety or a part of a polymer backbone, or a hydrocarbon-based electrolyte that does not contain fluorine atoms in a polymer backbone is applicable. While the polymer electrolyte used in the catalyst layers 22 and 23 may be the same as or different from the polymer electrolyte used in the electrolyte membrane 21, it is preferably the same from the viewpoint of enhancement of adhesion of the catalyst layers 22 and 23 to the electrolyte membrane 21.

The thickness of the catalyst layers is not particularly limited as long as it allows sufficient catalysis of the oxidation reaction of hydrogen (anode side) and the reduction action of oxygen (cathode side), and a thickness similar to the known thickness can be used. Specifically, the thickness of the catalyst layers is preferably 1 to 10 μm.

The gas diffusion layers 24 and 25 are formed by using, as a base material, a conductive and porous sheet-shaped material, for example, fabric, paper-like paper-making material, felt, or nonwoven fabric made of carbon such as carbon fiber. While the thickness of the base material is not particularly limited, it is preferably 30 to 500 μm from the viewpoints of mechanical strength and permeability of gas and water. In the gas diffusion layers 24 and 25, the base material preferably contains a water repellent from the viewpoints of water repellency and suppression of a flooding phenomenon. Examples of the water repellent area fluorine-based polymer material, such as PTFE, PVDF, polyhexafluoropropylene, or a tetrafluoroethylene-hexafluoropropylene copolymer (FEP), polypropylene, and polyethylene.

The material of the separators 31 and 32 is not limited to a stainless steel sheet, and other metal materials (for example, an aluminum plate or a clad material), or carbon, such as dense carbon graphite or a carbon plate, can be applied. When carbon is applied, the grooves 31a and 32a can be formed by cutting or screen printing.

Figure 2:
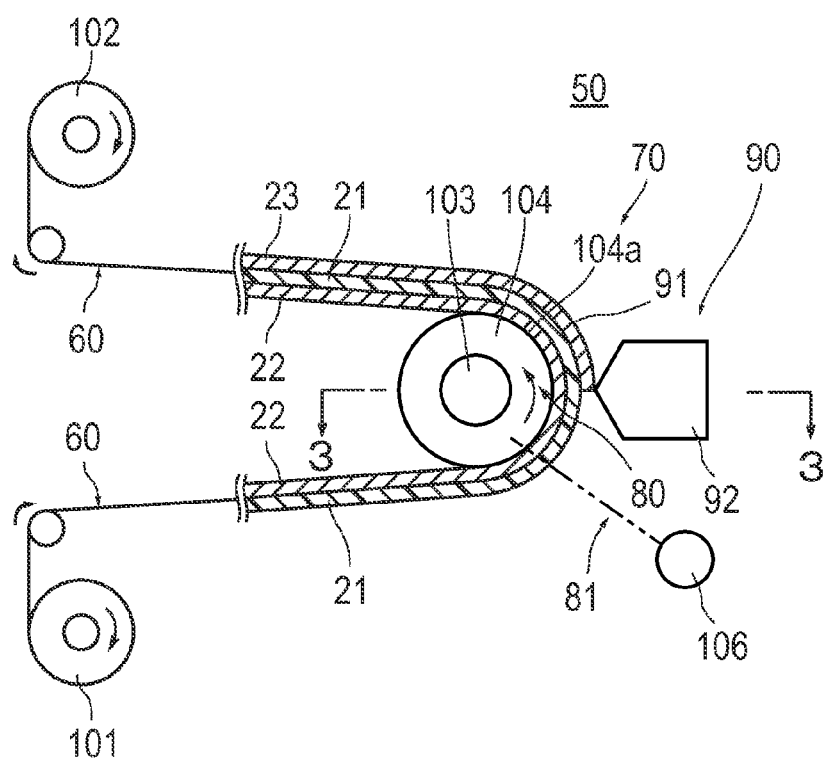
FIG. 2 is a schematic structural view of a coating apparatus according to a first embodiment.
Figure 3:
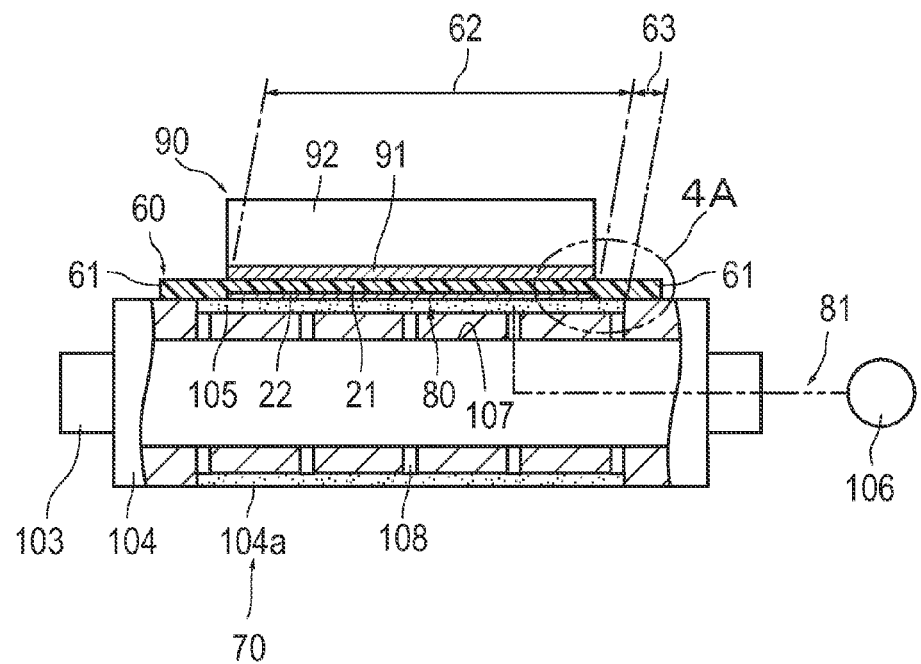
FIG. 3 is a cross-sectional view taken along line 3-3 of FIG. 2.
Figure 4:
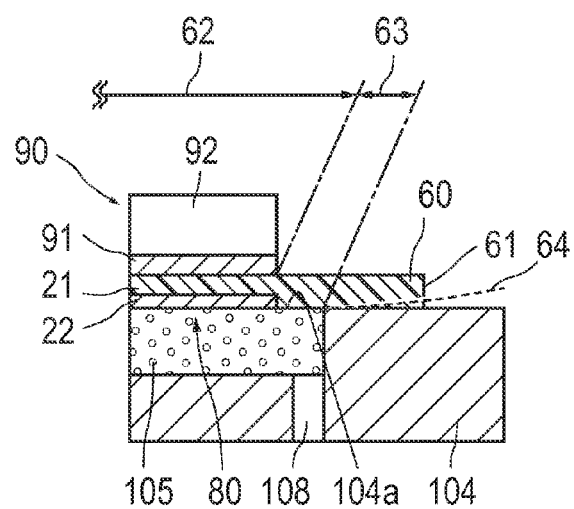
FIG. 4 is an enlarged view of a section 4A in FIG.

Next, a coating apparatus 50 will be described with reference to FIGS. 2 to 4. FIG. 2 is a schematic structural view of a coating apparatus 50 according to an embodiment of the present invention, FIG. 3 is a cross-sectional view taken along line 3-3 of FIG. 2, and FIG. 4 is an enlarged view of a section 4A in FIG. 3.

The coating apparatus 50 will be described briefly. The coating apparatus 50 includes a base plate 70 on which a flexible sheet member 60 shaped like a thin film is to be placed, a drawing unit 80 that draws the sheet member 60 onto the base plate 70, and a coating mechanism 90 that applies a material 91 onto the sheet member 60 drawn on the base plate 70 by the drawing unit 80. The sheet member 60 has a coating area 62, where the material 91 is to be applied, in a range extending from a center portion to portions on inner sides of outer peripheral edges 61. The drawing unit 80 draws the sheet member 60 on the base plate 70 in the coating area 62 where the material 91 is applied, and also draws the sheet member 60 on the base plate 70 in a range 63 extending outward beyond the coating area 62 (see FIGS. 3 and 4). The sheet member 60 can be applied to both a one-sided coated sheet member to be coated with the material 91 only on one side, and a double-sided coated sheet member to be coated with the material 91 on both surfaces. That is, the surface of the sheet member 60 to be drawn on the base plate 70 by the drawing unit 80 may be a surface on which the material 91 has not been applied yet or a surface on which the material 91 has already been applied.

Specifically, "a range 63 extending outward beyond the coating area 62" in which the drawing unit 80 draws the sheet member 60 on the base plate 70 includes the next three ranges. The first range is a range that is larger than the coating area 62, but is smaller than the area of the sheet member 60, the second range is a range that is equal in size to the sheet member 60, and the third range is a range that is larger than the sheet member 60. In this embodiment, a manner in which the sheet member 60 is drawn in the first range, which is larger than the coating area 62 but is smaller than the area of the sheet member 60, will be described as an example.

In the illustrated embodiment, the sheet member 60 is formed of a solvent-impregnated material. The solvent-impregnated material is defined as a material whose volume is changed by absorption of solvent. While the solvent is, for example, water or organic solvent, it is not limited thereto.

More specifically, the sheet member 60 is an electrolyte membrane 21 formed of a solvent-impregnated material and provided with electrode catalyst layers 22 and 23. The material 91 to be applied onto the sheet member 60 is catalyst ink for the electrode catalyst layers 22 and 23. When the catalyst ink is applied, the electrolyte membrane 21 is swollen by impregnation with the solvent in the catalyst ink. Swelling of the electrolyte membrane 21 also occurs in the range extending outward beyond the coating area 62. The electrolyte membrane 21 is one of the double-sided coated sheet members.

The electrolyte membrane 21 is long and is wound around a supply reel 101. FIGS. 2 to 4 illustrate a manner in which catalyst ink 91 for forming one catalyst layer (for example, cathode catalyst layer 23) is applied onto an electrolyte membrane 21 on which the other catalyst layer (for example, anode catalyst layer 22) has already been formed. The electrolyte membrane 21 is transported by a roll-to-roll method. The electrolyte membrane 21 is paid out from the supply reel 101, and is sequentially wound around a take-up reel 102. The coating mechanism 90 is disposed in a transport path through which the electrolyte membrane 21 is transported from the supply reel 101 to the take-up reel 102. Between the supply reel 101 and the take-up reel 102, a suction roller 104 is disposed to be rotatable on a rotation shaft 103. The suction roller 104 transports the electrolyte membrane 21 while drawing the electrolyte membrane 21 on its peripheral wall 104a. The peripheral wall 104a of the suction roller 104 corresponds to the base plate 70 on which the sheet member 60 is placed. For example, the peripheral wall 104a is formed by a porous body such as a punching plate having multiple micropores 105.

The drawing unit 80 includes a suction mechanism 81 that draws the electrolyte membrane 21 by pressure difference. In this case, the suction mechanism 81 includes the suction roller 104 having the micropores 105 provided in the peripheral wall 104a and channels 108 for connecting the drawing unit 80 and a suction chamber 107, a vacuum pump 106 that sucks air from the suction chamber 107 provided in the suction roller 104, and so on. The suction mechanism 81 sucks air from the suction chamber 107 to form a pressure difference between the inside of the suction roller 104 with negative pressure and the outside of the suction roller 104 with atmospheric pressure. By this pressure difference, the electrolyte membrane 21 is drawn onto the peripheral wall 104a.

It is preferable to dry applied catalyst ink 91 while drawing the electrolyte membrane 21 on the peripheral wall 104a of the suction roller 104 by the drawing unit 80. This is because deformation of the electrolyte membrane 21 due to drying can be suppressed. While a mechanism for drying the catalyst ink 91 is not particularly limited, a known mechanism can be applied, for example, temperature-increased atmospheric gas is blown onto the electrolyte membrane 21.

The catalyst ink 91 can also be dried in the transport path before the electrolyte membrane 21 is wound around the take-up reel 102. In this case, the catalyst ink 91 is preferably dried between the suction roller 104 and the take-up reel 102 while drawing the electrolyte membrane 21 on a base plate by a drawing unit. The base plate disposed in the transport path can be formed of a porous body, such as a punching plate having multiple micropores, similarly to the above-described peripheral wall 104a. The drawing unit disposed in the transport path can have a suction mechanism for drawing the electrolyte membrane 21 by pressure difference, similarly to the above-described drawing unit 80.

For example, the suction chamber 107 in the suction roller 104 is divided into a plurality of sections, and vacuum suction and pressure release can be switched in each of the sections. The suction chamber 107 continues to draw the electrolyte membrane 21 until the electrolyte membrane 21 separates from the peripheral wall 104a. This is because deformation of the electrolyte membrane 21 during drying can be suppressed by maintaining the drawn state of the electrolyte membrane 21 on the suction roller 104 for as long a time as possible.

To promote drying the applied catalyst ink 91, a heater for increasing the temperature of the peripheral wall 104a may be disposed within the suction roller 104, or a heater for increasing the temperature of the applied catalyst ink 91 may be disposed opposed to the suction roller 104. As to the base plate disposed in the transport path, a heater for increasing the temperature of the base plate may be disposed within the base plate, or a heater for increasing the temperature of the applied catalyst ink 91 may be disposed opposed to the base plate.

The coating mechanism 90 includes a coater head 92 disposed opposed to the suction roller 104. To the coater head 92, catalyst ink 91 is supplied from an unillustrated material supply source.

With reference to FIGS. 3 and 4, a description will be given of the coating area 62 where the catalyst ink 91 is to be applied and the range where the electrolyte membrane 21 is to be drawn on the suction roller 104. For convenience of explanation, the direction of the rotation shaft 103 of the suction roller 104 is referred to as the width direction of the electrolyte membrane 21, the width direction of the coating area 62, the width direction of the suction roller 104, and the width direction of an area where the micropores 105 are provided.

The electrolyte membrane 21 has the coating area 62, where the catalyst ink 91 is to be applied, in a range from the center portion to portions on an inner side of the outer peripheral edges 61. That is, the width of the coating area 62 is smaller than the width of the electrolyte membrane 21. An ink discharge port of the coater head 92 has a width equal to the width of the coating area 62. The widthwise center of the coater head 92 coincides with the widthwise center of the suction roller 104. The electrolyte membrane 21 is drawn and transported by the suction roller 104 with its widthwise center being aligned with the widthwise center of the suction roller 104.

The widthwise center of the range of the surface of the suction roller 104 where the micropores 105 are provided coincides with the widthwise center of the suction roller 104. Further, the width of the range where the micropores 105 are provided is larger than the width of the coating area 62. Therefore, the drawing unit 80 draws the electrolyte membrane 21 on the peripheral wall 104a in the coating area 62, and also draws the electrolyte membrane 21 on the peripheral wall 104a in the range 63 extending outward beyond the coating area 62.

Next, the operation of this embodiment will be described.

The electrolyte membrane 21 is paid out from the supply reel 101, is transported while being drawn on the peripheral wall 104a by pressure difference, and is wound around the take-up reel 102. While the electrolyte membrane 21 is being transported, the catalyst ink 91 is applied onto the electrolyte membrane 21 by the coater head 92.

The width of the range where the micropores 105 are provided is larger than the width of the coating area 62. The drawing unit 80 draws the electrolyte membrane 21 on the peripheral wall 104a in the coating area 62 where the catalyst ink 91 is applied, and also draws the electrolyte membrane 21 on the peripheral wall 104a in the range 63 extending outward beyond the coating area 62.

Since the electrolyte membrane 21 is a thin film, even in a state in which the catalyst ink 91 is not applied to any of the surfaces of the electrolyte membrane 21, the electrolyte membrane 21 itself is wrinkled in an outer peripheral portion of the coating area 62, and is wrinkled in the range 63 extending outward beyond the coating area 62. The electrolyte membrane 21 formed of the solvent-impregnated material swells while absorbing the solvent in the catalyst ink 91. Since impregnation with the solvent is performed even in the range 63 extending outward beyond the coating area 62, swelling of the electrolyte membrane 21 also occurs in the portion on the ouster side of the coating area 62. When the applied catalyst ink 91 dries, the range 63 extending outward beyond the coating area 62 also shrinks. As a result, the electrolyte membrane 21 having one surface coated with the catalyst ink 91 is wrinkled in the outer peripheral portion of the coating area 62 and the range 63 extending outward beyond the coating area 62.

Figure 5:
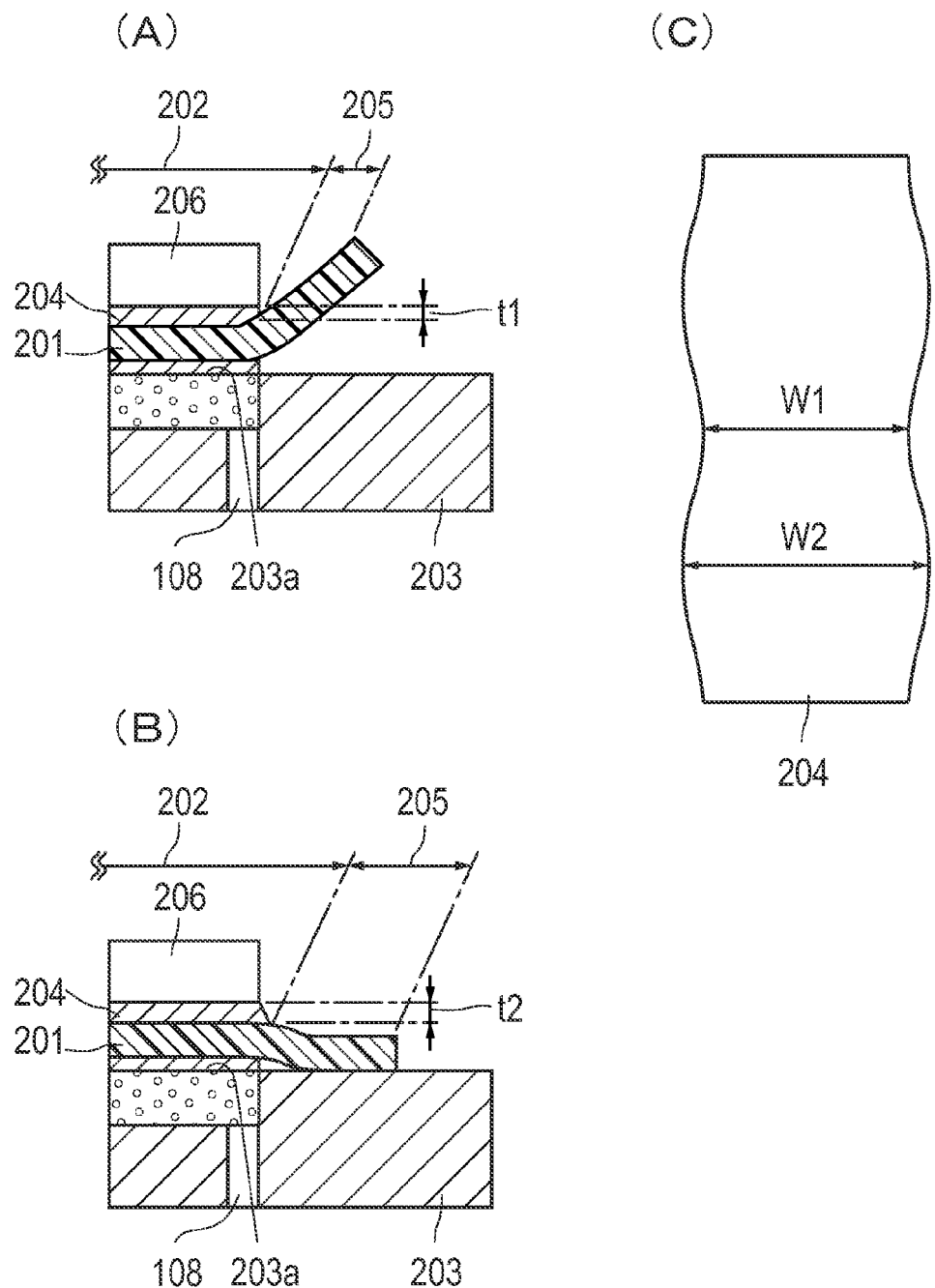
FIGS. 5(A), 5(B), and 5(C) are explanatory views used to explain trouble that may occur in a comparative example in which an electrolyte membrane is drawn in a range that does not extend outward from a coating area.

When an electrolyte membrane 201 is drawn on a peripheral wall 203a of a suction roller 203 in a range that does not extend outward beyond a coating area 202, as in a comparative example illustrated in FIG. 5, the following problem occurs. When applied catalyst ink 204 dries, a portion 205 extending outward beyond the coating area 202 also shrinks, and wrinkles prominently appear in the portion 205 extending outward beyond the coating area 202 of the electrolyte membrane 201. By the influence of the wrinkles, the distance between a coater head 206 and the electrolyte membrane 201 is changed. As a result, the shape of an electrode reacting portion of the electrolyte membrane 201 distorts, and dimensional changes occur in widths w1 and w2 and thicknesses t1 and t2 in widthwise end portions of the catalyst layer. Deformation of the electrolyte membrane 201 deteriorates cell performance of the fuel cell.

In contrast, in the first embodiment, when the catalyst ink 91 is applied, the electrolyte membrane 21 is drawn on the peripheral wall 104a in the range 63 extending outward beyond the coating area 62. For this reason, wrinkling in the portion extending outward beyond the coating area 62 can be suppressed, and the distance between the coater head 92 and the electrolyte membrane 21 does not change. In any of the case in which the catalyst ink 91 is applied onto the first surface of the electrolyte membrane 21 and the case in which the catalyst ink 91 is further applied to the second surface of the electrolyte membrane 21 having the first surface to which the catalyst ink 91 has already been applied, wrinkling can be suppressed. As a result, distortion of the shape of the coating area 62 of the electrolyte membrane 21 can be prevented, and the dimensional changes do not occur to the width and the thickness of the widthwise end portions of the catalyst layer. Hence, according to the fuel cell to which the electrolyte membrane 21 is applied, the cell performance can be prevented from being deteriorated by deformation of the electrolyte membrane.

Deformation of the electrolyte membrane 21 is suppressed without sticking a backup film to a surface of the electrolyte membrane 21 opposite from the coating surface. Steps of sticking and removing the backup film are unnecessary, and the manufacturing cost is not increased. Further, the problem in that the electrolyte membrane may be broken when the backup film is removed does fundamentally not occur.

It is conceivable to suppress deformation of the electrolyte membrane by clamping the electrolyte membrane by a mask film having an aperture and to apply the catalyst ink after that. However, a mask film serving as a subsidiary material to be disposed of after use is necessary, and a step of forming the aperture in the mask film, a step of sticking the mask film to the electrolyte membrane, a step of removing the mask film from the electrolyte membrane, and so on are necessary. As a result, the manufacturing cost becomes relatively high.

In contrast to this, in the embodiment, the operations of fixing the outer peripheral edges 61 of the electrolyte membrane 21 to the peripheral wall 104a and unfixing the outer peripheral edges 61 from the peripheral wall 104a are performed only by the drawing unit 80. Therefore, a subsidiary material such as a mask film is unnecessary, and the step of sticking the mask film and the step of removing the mask film are unnecessary. Hence, the increase in cost can be suppressed.

In this case, as shown by a broken arrow 64 in FIG. 4, air is sucked from a minute gap between the widthwise end portions of the electrolyte membrane 21 and the peripheral wall 104a, and some air leakage sometimes occurs. Measures against air leakage in this portion may be taken. For example, covers to be placed on the widthwise end portions of the electrolyte membrane 21 are attached to the outer periphery of the suction roller 104. When the covers are drawn and placed on the widthwise end portions of the electrolyte membrane 21, air leakage can be reduced. The covers have axial cuts provided at predetermined intervals in the circumferential direction. By forming the cuts, the transported electrolyte membrane 21 separates from the peripheral wall 104a without any trouble.

Conversely to the above, measures against air leakage at the outer peripheral edges 61 of the electrolyte membrane 21 can be omitted. This case has the following merits. When vacuum suction is stopped, air leakage occurs at the outer peripheral edges 61 of the electrolyte membrane 21. Hence, release from the vacuum suction state (vacuum release) is easy, and vacuum release is not performed through the electrolyte membrane 21. Since the time necessary for the vacuum release is shortened, quick transition to the next step can be achieved, and this can enhance mass productivity. It is unnecessary to add a valve for vacuum release, and equipment cost is not increased. Vacuum release is performed through the micropores 105 of the suction roller 104 in the center portion of the electrolyte membrane 21, and vacuum release is also performed at the outer peripheral edges 61 of the electrolyte membrane 21. Since vacuum release is thus performed at almost the same time both in the center portion and the outer peripheral edges 61 of the electrolyte membrane 21, stress concentration does not occur in the electrolyte membrane 21, and the occurrence of a crack called a mud crack can be avoided. Further, in a manner which an electrolyte membrane 21 cut to a predetermined size drawn on the base plate 70, air leakage occurs at outer peripheral edges 61, and therefore, the electrolyte membrane 21 can be easily picked up in the next step.

As described above, the coating apparatus 50 according to the first embodiment includes the peripheral wall 104a on which the electrolyte membrane 21 serving as the sheet member 60 is placed, the drawing unit 80, and the coating mechanism 90. The drawing unit 80 draws the electrolyte membrane 21 on the peripheral wall 104a in the coating area 62 where the catalyst ink 91 is to be applied, and also draws the electrolyte membrane 21 on the peripheral wall 104a in the range 63 extending outward beyond the coating area 62. For this reason, wrinkling in the outer peripheral portion of the coating area 62 of the electrolyte membrane 21 and wrinkling in the range 63 extending outward beyond the coating area 62 can be suppressed, and the distance between the coater head 92 of the coating mechanism 90 and the electrolyte membrane 21 is not changed by the influence of wrinkling. As a result, distortion of the shape of the coating area 62 of the electrolyte membrane 21 can be prevented, and the dimensional changes in the width and the thickness of the widthwise end portions of the catalyst layers 22 and 23 can be suppressed.

For example, the material of the sheet member 60 is a solvent-impregnated material. The peripheral wall 104a is formed by a porous body, and the drawing unit 80 has the mechanism that draws the electrolyte membrane 21 by pressure difference. In this case, wrinkling in the swelling portion extending outward beyond the coating area 62 can be suppressed by drawing the electrolyte membrane 21 by the pressure difference.

The surface of the electrolyte membrane 21 to be drawn on the peripheral wall 104a by the drawing unit 80 is a surface to which the catalyst ink 91 has not been applied yet, or a surface to which the catalyst ink 91 has already been applied. According to this structure, wrinkling can be suppressed both when the catalyst ink 91 is applied to the first surface of the electrolyte membrane 21 and when the catalyst ink 91 is further applied to the second surface of the electrolyte membrane 21 with the first surface to which the catalyst ink 91 has been applied. As a result, in any of the cases of one-sided coating and double-sided coating, distortion of the shape of the coating area 62 can be prevented, and the dimensional changes of the catalyst layers 22 and 23 can be reduced.

The electrolyte membrane 21 has a long shape such as to be paid out from the supply reel 101 and to be sequentially wound around the take-up reel 102. The coating mechanism 90 is disposed in the transport path through which the electrolyte membrane 21 is transported from the supply reel 101 to the take-up reel 102. According to this structure, since the electrolyte membrane 21 is transported by the roll-to-roll method, the catalyst layers 22 and 23 can be efficiently formed on the electrolyte membrane 21.

The applied catalyst ink 91 is dried while the electrolyte membrane 21 is drawn on the peripheral wall 104a by the drawing unit 80. Thus, deformation of the electrolyte membrane 21 due to drying can be suppressed. As a result, the dimensional changes of the catalyst layers 22 and 23 can be reduced further.

The sheet member 60 is the electrolyte membrane 21 on which the electrode catalyst layers 22 and 23 are provided, and the material 91 is the catalyst ink 91 for the electrode catalyst layers. Since deformation of the electrolyte membrane 21 provided with the catalyst layers 22 and 23 can be suppressed, according to the fuel cell to which the electrolyte membrane 21 is applied, the cell performance can be prevented from being deteriorated by deformation of the electrolyte membrane.

(Second Embodiment)

Figure 6:
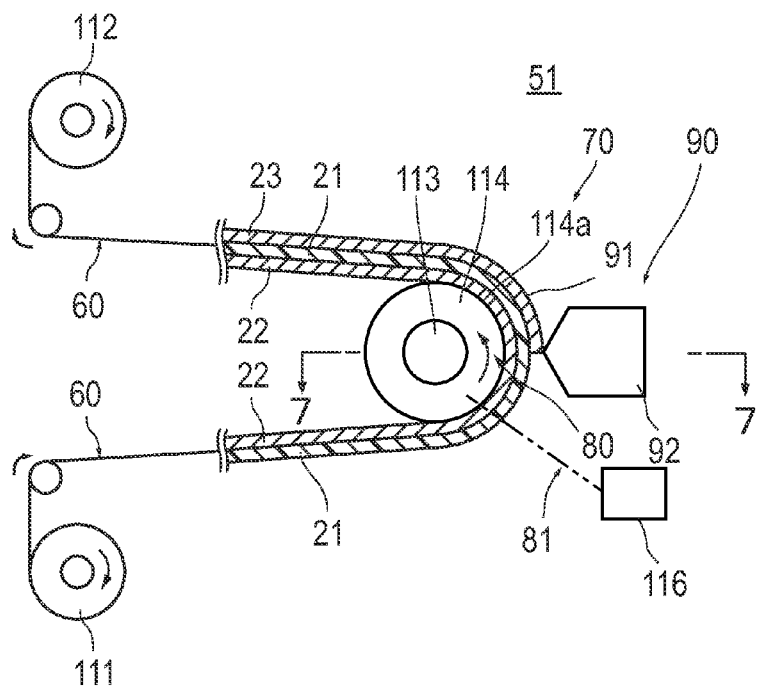
FIG. 6 is a schematic structural view of a coating apparatus according to a second embodiment.
Figure 7:
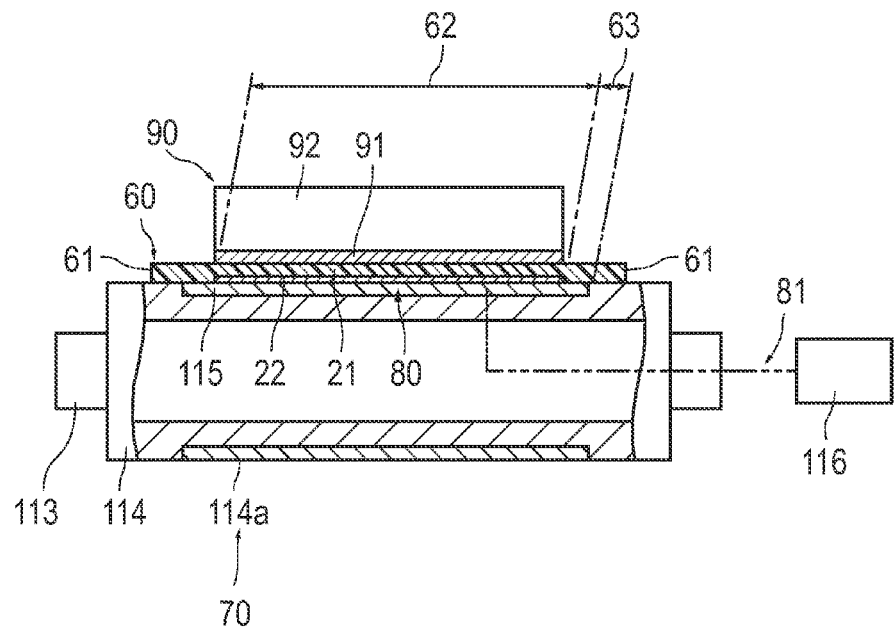
FIG. 7 is a cross-sectional view taken along line 7-7 of FIG. 6.

FIG. 6 is a schematic structural view of a coating apparatus 51 according to a second embodiment, and FIG. 7 is a cross-sectional view taken along line 7-7 of FIG. 6. Members common to the first embodiment are denoted by the same reference numerals, and descriptions thereof will be partly omitted.

The second embodiment is different from the first embodiment, in which the electrolyte membrane 21 is drawn on the base plate 70 by the pressure difference, in that an electrolyte membrane 21 is electrostatically attracted on a base plate 70.

Similarly to the coating apparatus 50 of the first embodiment, the coating apparatus 51 of the second embodiment includes a base plate 70 on which an electrolyte membrane 21 is to be placed, a drawing unit 80 that draws the electrolyte membrane 21 on the base plate 70, and a coating mechanism 90 that applies catalyst ink 91 for electrode catalyst layers 22 and 23 onto the electrolyte membrane 21. The drawing unit 80 draws the electrolyte membrane 21 on the base plate 70 in a coating area 62 where the catalyst ink 91 is to be applied, and also draws the electrolyte membrane 21 on the base plate 70 in a range 63 extending outward beyond the coating area 62.

The electrolyte membrane 21 is paid out from a supply reel 111, and is sequentially wound around a take-up reel 112. An electrostatic attracting roller 114 rotatable on a rotation shaft 113 is disposed between the supply reel 111 and the take-up reel 112. The electrostatic attracting roller 114 attracts and transports the electrolyte membrane 21 on a peripheral wall 114a. The peripheral wall 114a of the electrostatic attracting roller 114 corresponds to a base plate 70 on which a sheet member 60 is to be placed. For example, the peripheral wall 114a is formed by an attraction plate 115 in which electrodes for generating electrostatic attracting force are provided.

The drawing unit 80 includes an attraction mechanism 81 that electrostatically attracts the electrolyte membrane 21. In this case, the attraction mechanism 81 includes an attraction plate 115 that forms the peripheral wall 114a, a power supply 116 for supplying electric power to the electrodes provided in the attraction plate 115, and so on. The attraction mechanism 81 supplies electric power to the electrodes in the attraction plate 115 to generate static electricity in the attraction plate 115. By this static electricity, the electrolyte membrane 21 is attracted on the peripheral wall 114*a*.

Applied catalyst ink 91 is dried while the electrolyte membrane 21 is being attracted on the electrostatic attracting roller 114 by the drawing unit 80 utilizing static electricity. This is because deformation of the electrolyte membrane 21 due to drying can be suppressed. While a mechanism for drying the catalyst ink 91 is not particularly limited, a known mechanism can be applied, for example, temperature-increased atmospheric gas is blown onto the electrolyte membrane 21.

The catalyst ink 91 can also be dried in a transport path through which the electrolyte membrane 21 is transported before being wound around the take-up reel 112, similarly to the first embodiment. In this case, the catalyst ink 91 is preferably dried between the electrostatic attracting roller 114 and the take-up reel 112 while the electrolyte membrane 21 is being attracted on the base plate by the drawing unit utilizing static electricity.

To dry the applied catalyst ink 91, a heater for increasing the temperature of the attraction plate 115 in the electrostatic attracting roller 114 is disposed within the electrostatic attracting roller 114, or a heater for increasing the temperature of the applied catalyst ink 91 is disposed opposed to the electrostatic attracting roller 114. As to the base plate disposed in the transport path, a heater for increasing the temperature of the base plate may be disposed within the base plate, or a heater for increasing the temperature of the applied catalyst ink 91 may be disposed opposed to the base plate.

As illustrated in FIG. 7, the width of the attraction plate 115 in the electrostatic attracting roller 114 is larger than the width of the coating area 62. Therefore, in the second embodiment, the electrolyte membrane 21 is also attracted on the attraction plate 115 in the coating area 62, and the electrolyte membrane 21 is attracted on the attraction plate 115 in the range 63 extending outward beyond the coating area 62.

In the second embodiment, the electrolyte membrane 21 is also attracted on the attraction plate 115 in the range 63 extending outward beyond the coating area 62 when the catalyst ink 91 is applied. For this reason, the portions on the outer sides of the coating area 62 can be restricted from being wrinkled, and the distance between a coater head 92 and the electrolyte membrane 21 does not change. Wrinkling can be suppressed in both when the catalyst ink 91 is applied to a first surface of the electrolyte membrane 21 and when the catalyst ink 91 is further applied to a second surface of the electrolyte membrane 21 having the first surface to which the catalyst ink 91 has already been applied. As a result, distortion of the shape of the coating area 62 of the electrolyte membrane 21 can be prevented, and the dimensional changes in the width and the thickness in the widthwise end portions of the catalyst layers do not occur. Hence, according to a fuel cell to which the electrolyte membrane 21 is applied, cell performance can be prevented from being deteriorated by deformation of the electrolyte membrane 21.

As described above, the coating apparatus 51 of the second embodiment includes the peripheral wall 114*a* on which the electrolyte membrane 21 serving as the sheet member 60 is placed, the drawing unit 80, and the coating mechanism 90. The drawing unit 80 draws the electrolyte membrane 21 on the peripheral wall 114*a* in the coating area 62 where the catalyst ink 91 is to be applied, and also draws the electrolyte membrane 21 on the peripheral wall 114*a* in the range 63 extending outward beyond the coating area 62. For this reason, wrinkling in the outer peripheral portions of the coating area 62 of the electrolyte membrane 21 and wrinkling in the range 63 extending outward beyond the coating area 62 can be suppressed, and the distance between the coater head 92 of the coating mechanism 90 and the electrolyte membrane 21 is not changed by the influence of wrinkling. As a result, distortion of the shape of the coating area 62 of the electrolyte membrane 21 can be prevented, and the dimensional changes in the width and the thickness of the widthwise end portions of the catalyst layers 22 and 23 can be reduced.

For example, the material of the sheet member 60 is the electrolyte membrane 21 formed of a solvent-impregnated material. The drawing unit 80 includes the mechanism that electrostatically attracts the electrolyte membrane 21. In this case, since the electrolyte membrane 21 is electrostatically attracted, wrinkling of the swelling portion on the outer side of the coating area 62 can be suppressed.

(Other Modifications)

The present invention is not limited to the above-described embodiments, and can be modified appropriately.

For example, while the electrolyte membrane 21 provided with the electrode catalyst layers 22 and 23 has been described as the example of the sheet member 60 and the catalyst ink 91 for the electrode catalyst layers has been described as the example of the material 91, the present invention is not limited to this case. Further, while the electrolyte membrane 21 formed of the solvent-impregnated material has been described as the example of the sheet member 60, the present invention is not limited to this case. The sheet member 60 can be applied in various forms as long as it is shaped like a flexible thin film, and may be formed of a porous material. The material 91 to be applied can be applied in various forms in correspondence with the types of the sheet member 60.

While the manner in which the drawing unit 80 draws almost the entire coating area 62, to which the catalyst ink 91 is applied, on the base plate 70 has been described, the present invention is not limited to this case. The range where the sheet member 60 is drawn on the base plate 70 may be a part of the coating area 62 where the material 91 is applied. Further, the drawing force may be partly changed to an extent such as not to wrinkle the sheet member 60 to be drawn.

While the space opposite from the space in which the sheet member 60 is placed, of both spaces between which the base plate 70 is provided, has negative pressure in the first embodiment, the structure of the drawing unit 80 utilizing pressure difference is not limited to this case. The sheet member 60 can be drawn on the base plate 70 as long as there is a pressure difference between both spaces between which the base plate 70 is provided. Therefore, the sheet member 60 can also be drawn on the base plate 70 by pressure difference even in a manner in which the pressure in the space, where the sheet member 60 is placed, is increased above the atmospheric pressure and the pressure in the opposite space is released to the atmospheric pressure.

While the manner in which the catalyst ink 91 is applied by the coater head 92 has been described, the method and structure for applying the catalyst ink 91 onto the electrolyte membrane 21 are not particularly limited. For example, a known method, such as screen printing or a spray method, can be applied similarly. The shape and structure of the base plate 70 on which the electrolyte membrane 21 is placed, or the drawing method of the drawing unit 80 can be selected in accordance with the application method for the catalyst ink 91.

This application is based upon Japanese Patent Application No. 2012-217075, filed on Sep. 28, 2012, the entire disclosed contents of which are incorporated herein by reference.

REFERENCE SIGNS LIST

10 Single cell
20 Membrane electrode assembly (MEA)
20 Electrolyte membrane
22, 23 Catalyst layer
24, 25 Gas diffusion layer
31, 32 Separator
50, 51 Coating apparatus
60 Sheet member
61 Outer peripheral edge
62 Coating area
63 Range extending outward beyond coating area
70 Base plate
80 Drawing unit
81 Suction mechanism
90 Coating mechanism
91 Catalyst ink (material)
92 Coater head
101 Supply reel
102 Take-up reel
103 Rotation shaft
104 Suction roller
104a Peripheral wall of suction roller (base plate)
105 Micropore
106 Vacuum pump
107 Suction chamber
108 Channel
111 Supply reel
112 Take-up reel
113 Rotation shaft
114 Electrostatic attracting roller
114a Peripheral wall of electrostatic attracting roller (base plate)
115 Attraction plate
116 Power supply

The invention claimed is:

1. A coating apparatus for applying a coating material onto a sheet member, comprising:
a base plate on which a flexible sheet member is placed;
an attraction plate having electrodes connected to a power supply for supplying electric power to the electrodes, wherein the attraction plate electrostatically draws the sheet member onto the base plate; and
a coating unit configured to apply a coating material onto the sheet member drawn on the base plate by the attraction plate,
wherein the sheet member has, in a range from a center portion to a portion on an inner side of an outer peripheral edge, a coating area where the coating material is to be applied,
wherein the attraction plate has a width larger than a width of the coating area and extends outward in the range between the coating area and the outer peripheral edge of the sheet member, and
wherein the attraction plate draws the sheet member on the base plate in the coating area where the coating material is to be applied, and also draws the sheet member on the base plate in a range extending outward beyond the coating area.

2. The coating apparatus according to claim 1, wherein the sheet member is formed of a porous material or a solvent-impregnated material.

3. The coating apparatus according to claim 1, wherein a surface of the sheet member drawn on the base plate by the attraction plate is a surface to which the coating material has not been applied yet or a surface to which the coating material has already been applied.

4. The coating apparatus according to claim 1,
wherein the sheet member has a long shape such as to be paid out from a supply reel and to be sequentially wound around a take-up reel, and
wherein the coating unit is disposed in a transport path through which the sheet member is transported from the supply reel to the take-up reel.

5. The coating apparatus according to claim 1, wherein the applied coating material is dried while the sheet member is drawn on the base plate by the attraction plate.

6. The coating apparatus according to claim 1,
wherein the sheet member is an electrolyte membrane having an electrode catalyst layer, and
wherein the coating material is catalyst ink for the electrode catalyst layer.

* * * * *